United States Patent [19]
Verbeek

[11] Patent Number: 5,119,372
[45] Date of Patent: Jun. 2, 1992

[54] MULTI-ACCESS ATD MULTIPLEXER WITH CONGESTION DETECTION CIRCUITRY

[75] Inventor: Robert J. M. Verbeek, Hilversum, Netherlands

[73] Assignee: AT&T Bell Laboratories, Murray Hill, N.J.

[21] Appl. No.: 518,901

[22] Filed: May 4, 1990

[30] Foreign Application Priority Data

May 10, 1989 [NL] Netherlands ................ 8901171

[51] Int. Cl.⁵ ................................................ H04J 3/02
[52] U.S. Cl. ................................ 370/85.3; 370/60; 370/91; 370/94.1
[58] Field of Search ............... 370/112, 91, 85.2, 85.3, 370/85.6, 93, 94.1, 80, 85.11, 60, 68.1

[56] References Cited
U.S. PATENT DOCUMENTS 4,412,326 10/1983 Limb ................ 370/94.1
4,969,149 11/1990 Killat et al. ............. 370/94.1
5,007,043 4/1991 Van den Dool et al. ......... 370/94.1

Primary Examiner—Douglas W. Olms
Assistant Examiner—Shick Hom
Attorney, Agent, or Firm—J. I. Caplan

[57] ABSTRACT

As shown in FIG. 2 an ATD multiplexer (1-$i$) comprises a congestion detector (34) for detecting internal traffic congestion when a data cell stream is transferred from one of the two data inputs (4, 5) to the data output (6). If internal traffic congestion occurs, congestion signal transmitter (36) will supply a congestion signal. An upstream ATD multiplexer (1-$j$) will receive this congestion signal as an external congestion signal through congestion signal receiver (37) and in response thereto blocks one of its two data inputs (4, 5). In this fashion the data supply to ATD multiplexer (1-$i$) will be restricted.

If the data supply to ATD multiplexer (1-$i$) is restricted to such an extent that internal traffic congestion no longer occurs in ATD multiplexer (1-$i$), the blocking of the blocked data input in ATD multiplexer (1-$j$) will be removed in a delayed manner.

The congestion signals can be transmitted over data bus (10) between data input (4, 5) of ATD multiplexer (1-$i$) and data output (6) of ATD multiplexer (1-$j$). Thus no special wire is required for transmitting congestion signals.

19 Claims, 5 Drawing Sheets

MULTI-ACCESS ATD MULTIPLEXER WITH CONGESTION DETECTION CIRCUITRY

This invention relates to a method of combining two streams of data cells into a single outgoing stream of data cells in an ATD multiplexer having a data input for each one of the two incoming data cell streams and a data output for the outgoing data cell stream. This invention likewise relates to an ATD multiplexer for implementing such a method.

The method and ATD multiplexers are used in an ATD network with information processing equipment (referred to as terminals hereinafter), ATD standing for: Asynchronous Time-Division. In such a network digital information in the form of packets having headers and data fields are combined and conveyed with fixed time intervals between two successive packets. The time interval between two successive data-containing packets is an integer number of packet lengths. The header comprises an address field indicating the address to which the packet is switched through and the data field comprises the digital information. The header may likewise include an "empty cell" code indicating that the packet does not contain any digital information. Packets are also called data cells. An ATD multiplexer combines incoming data cell streams to a single outgoing data cell stream. The incoming data cell streams originate from terminals or from preceding ATD multiplexers. The data cells in the outgoing data cell stream are transferred to further terminals, further multiplexers or to the output of the network according to their address fields.

An ATD network is used for transferring speech, image or computer data. These forms of digital information may be transmitted in bursts of data cells. A good example of this is the data stream coming from a Personal Computer in which variable time intervals without information-transfer are found between the transmitted data. The data rate of the data cells that can be conveyed in an undisturbed manner through an ATD network is bounded by a maximum. As a result of a large supply of data cells the maximum permissible data rate may be exceeded and internal traffic congestion will occur inside the ATD network.

When using a small-sized ATD network like users at home do, it need not be disastrous to lose information as a result of congestion. For example, it may be permitted that one or a plurality of data cells of a telephone conversation are lost. This reduces only the understandability, but the conversation need not become impossible provided that the number of lost data cells does not become large. A possibility of counteracting too large a loss of data cells is to make use of buffers for storing data temporarily when much information is offered. The disadvantage of this possibility is that much memory capacity is required and that even then there is still a chance of data cells being lost.

It is an object of the invention to provide a solution with respect to the state of congestion and to maintain the information transfer as much as possible.

For this purpose, the method according to the invention is characterized in that the occurrence of internal traffic congestion in the case of data cell stream transfer from a data input to a data output is detected, and upon detection of the internal traffic congestion an internal congestion signal having a first value is transmitted to a congestion signal transmitter associated with the relevant ATD multiplexer data input, in that the transport of a data cell stream via a data input is blocked in response to a first value of an external congestion signal received by the ATD multiplexer, in that after the internal traffic congestion has been cleared a second value of the internal traffic congestion signal corresponding with the cleared status is being transported to the congestion signal transmitter in a delayed manner and/or the second value of the external congestion signal is being received by the ATD multiplexer in a delayed manner, and/or the blocking of the data cell stream transport is being removed in a delayed manner upon detection of a change from the first value to a second value of the external congestion signal.

If the buffers associated with the data input of the ATD multiplexer through which input a data cell stream is transferred are full and also a next data cell is offered to the relevant data input, a first value of a binary internal congestion signal will be generated. This first value indicates that internal congestion has occurred in the relevant multiplexer. The second value of the internal congestion signal indicates that no internal congestion occurs in the multiplexer. The internal congestion signal is transmitted to a second ATD multiplexer by means of a congestion signal transmitter associated with the relevant data input, the signal direction of the congestion signal being upstream. The second ATD multiplexer receives this congestion signal coming from the exterior as an external congestion signal and if the external congestion signal has a first value the second multiplexer will block one of its two data inputs in response thereto. Consequently, the data supply to the first ATD multiplexer will be reduced.

Data transfer by means of the further data input of the second ATD multiplexer is maintained in the situation described hereinbefore. If, subsequently, in the first ATD multiplexer congestion is still detected, this means that the congestion is caused by a data cell stream through the non-blocked data input of the second ATD multiplexer. In that case internal traffic congestion will be detected also at this non-blocked data input and in response thereto an internal congestion signal will be generated inside the second multiplexer. Subsequently, the above-described process may be repeated in other ATD multiplexers until the blocking of ever more data inputs reduces the supply of data such that congestion will no longer be detected. In this manner the object of the invention is achieved by means of the aforedescribed process, that is to say, by removing or at least reducing the data supply that causes internal traffic congestion in a multiplexer.

Once it has been detected that the internal traffic congestion in the first ATD multiplexer has been cleared, the internal congestion signal obtains the second value corresponding with the cleared status. If the second upstream ATD multiplexer is informed at once of this second value, there is a possibility that congestion may immediately develop again. This will cause the development of rapidly alternating conditions of congestion and non-congestion in the first ATD multiplexer. In order to obviate this drawback the blocking of the blocked data input of the second ATD multiplexer is released in a delayed manner.

An embodiment of the method according to the invention is characterized in that switch priority is assigned to one of the two data inputs and in that the transfer of a data cell stream through the data input not having priority is blocked upon detection of the first value of an external congestion signal.

By assigning switch priority to a single data input it is given priority over the other data input for transferring data cells to the data output. If there is no congestion the data input not having priority can transfer data cells to the data output if entry data cells are offered to the data input having priority. When congestion does occur the data input not having priority is blocked. By assigning switch priority to the data input which is to transfer the more essential information of the two, the transfer of the more essential information can be largely maintained.

A further embodiment of the method according to the invention is characterized by the fact that the received external congestion signal is conveyed to the congestion signal transmitter associated with the blocked data input.

Conveying the external congestion signal will result in the fact that the occurrence of internal traffic congestion at a data input in an ATD multiplexer is announced to all ATD multiplexers upstream in the ATD network which are coupled to this data input. Consequently, these ATD multiplexers are informed of the fact that their information will not be transferred to the output of the network. As a reaction to this announcement ATD multiplexers will stop transmitting information because then it will not have any sense trying to transfer information.

A multiplexer for implementing the method according to the invention is characterized in that the ATD multiplexer comprises two data inputs and a data output, in that the ATD multiplexer comprises for each data input a congestion detector for detecting internal traffic congestion, an output of the detector being connected to the input of a congestion signal transmitter, in that the ATD multiplexer comprises blocking means for blocking the data cell stream transfer via a data input, in that the ATD multiplexer comprises a congestion signal receiver having an input for receiving the external congestion signal and an output connected to an input of the blocking means, each congestion signal transmitter comprising a delay element for applying in a delayed manner the second value of the internal congestion signal to the output of the congestion signal transmitter and/or in that the congestion signal receiver includes a delay element for applying in a delayed manner the second value of the external congestion signal to the output of the congestion signal receiver.

An embodiment of the multiplexer according to the invention is characterized in that one end of an impedance is connected to the data input and the other end is coupled to a reference terminal via switch means whereby the data input is connectable to a data receive line, in that the switch means are connected to an output of the congestion signal transmitter associated with the data input and switch off the impedance in response to the first value of the internal congestion signal, and in that the input of the congestion signal receiver is connected to the data output, this congestion signal receiver comprising detecting means linked to a data transfer line connected to the data output for detecting whether an impedance at the end of the data transfer line is switched off or not switched off, an input and an output of the detection means constituting the input and output respectively, of the congestion signal receiver.

If a data input of a first ATD multiplexer is connected to the data output of a second ATD multiplexer by means of a data bus, the latter will form a data receive line for the data input and a data transmit line for the data output. The impedance which is connected to the data input is then a characteristic terminating impedance of the data bus. The data bus comprises a stray capacitance which is charged when the signal voltage has a high value and is subsequently discharged through the impedance. If the impedance is switched off the stray capacitance of the data bus will be charged to the maximum available signal voltage value and will not be able to discharge after that. The detection means connected to the data output of the second ATD multiplexer generate a congestion signal at their outputs if detecting that for a specific period of time, which is long relative to the bit period of a signal, the voltage value on the data bus has not changed. The advantage of this embodiment is the fact that no additional wire is required for transmitting the congestion signal from the first ATD multiplexer to the second ATD multiplexer. A further advantage is the fact that wire breakage or a non-connected cable is detected and announced to a user in like manner.

Figure 1:
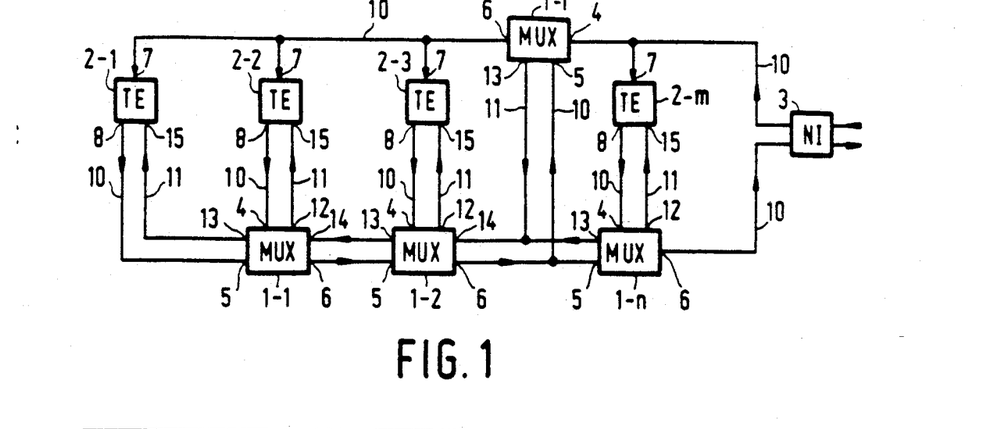
FIG. 1 shows a block diagram of an ATD network having ATD multiplexers and terminals.

The invention and its advantages will now be further explained and described with reference to the drawing Figures in which:

FIG. 1 shows an example of an ATD network in which data cell streams are distributed and combined all through the network. The ATD network is connected to a network interface 3 providing the communication with other communication networks such as the public telephone or broadcasting network.

The ATD network comprises ATD multiplexers 1-1, 1-2, ..., 1-n. Each ATD multiplexer has two data inputs 4 and 5, a data output 6, a congestion signal input 14 and congestion signal outputs 12 and 13. The network also includes terminals 2-1, 2-2, ..., 2-m in which each terminal 2 comprises a data input 7, a data output 8 and a congestion signal input 15. Data inputs 4 and 5 of a multiplexer 1 may be connected, via a data bus 10 to data output 6 of a further multiplexer 1, to a data output 8 of a terminal 2 or to a data output of network interface 3. In addition to being connected to a data input of a further multiplexer 1, data output 6 of multiplexer 1 can be connected to data input 7 of a terminal 2 or to a data input of network interface 3. Data input 7 or data output 8 of a terminal 2 may also be connected to network interface 3. By means of a congestion signal conductor 11 the congestion signal outputs 12 and 13 of a multiplexer are connected to congestion signal input 14 of a further multiplexer 1 or to the congestion signal input 15 of terminal 2.

The terminals 2-1, 2-2, ..., 2-m and the ATD multiplexers 1-1, 1-2, ..., 1-n are thus interconnected by means of data bus 10 and congestion conductor 11, so that mutual exchange of information between the terminals is possible. Examples of mutual information exchange are internal telephone calls or data exchange between Personal Computers. By means of a congestion signal conductor 11 a binary congestion signal is transmitted. The congestion signal has a logic value "0" when no congestion is detected and a logic value "1" if congestion is detected indeed.

When one of the multiplexers (for example, 1-i) detects internal traffic congestion, it will send a congestion signal with a logic value "1" via congestion conductor 11 to a second upstream multiplexer 1-j. Once this upstream multiplexer 1-j receives a congestion signal having the latter logic value, this multiplexer 1-j will block one of its data inputs in response thereto. This may lead to the fact that the data supply to multiplexer 1-i which has generated the congestion signal is restricted. When multiplexer 1-i no longer detects internal traffic congestion, the blocking of the data input of the multiplexer 1-j is cancelled in a delayed manner. A delay element may be inserted in the congestion signal conductor 11 between the first multiplexer 1-i and the second multiplexer 1-j. For clarity this has not been represented in the drawing FIG. 1. Another possibility to cancel the blocking of a data input of multiplexer 1-j in a delayed manner is that in which a multiplexer 1-i comprises delay elements connected to the congestion signal outputs 12 and 13 respectively, or in which multiplexer 1-j comprises a delay element connected to the congestion signal input 14. In the former case the congestion signal having the logic value "0" is delayed at the congestion signal output 12 or 13 of multiplexer 1-i and in the latter case the congestion signal is delayed at the input 14 of multiplexer 1-j.

Figure 2:
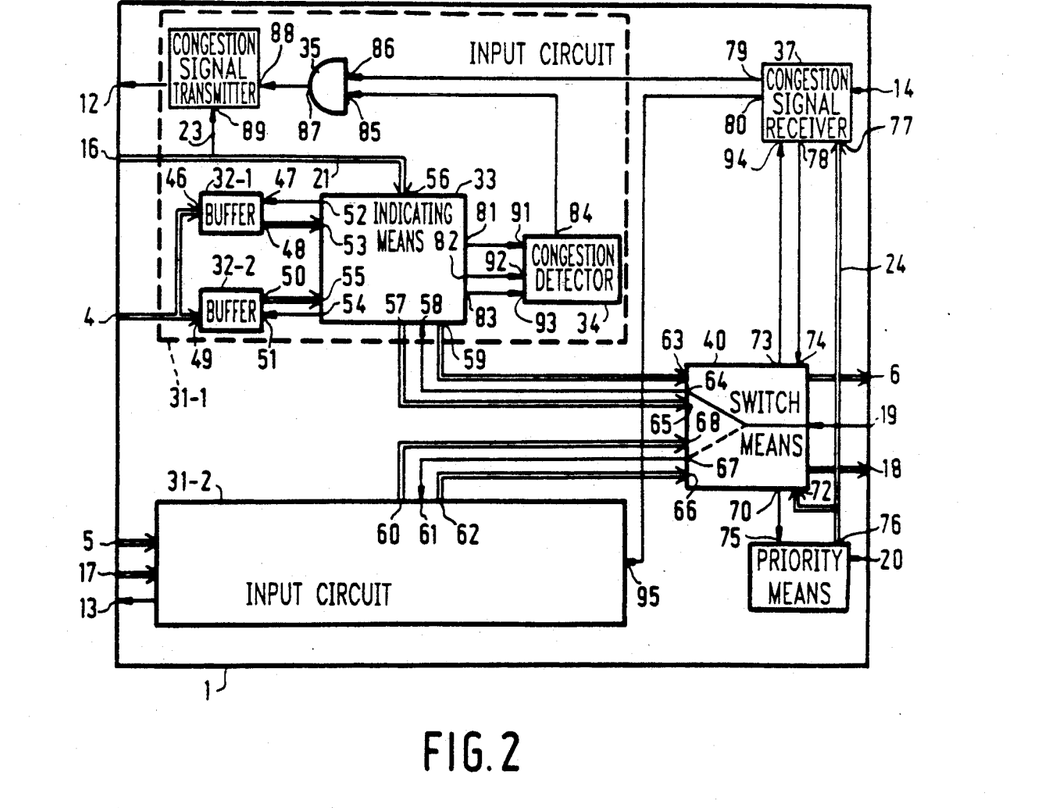
FIG. 2 shows an embodiment of an ATD multiplexer as represented in the block diagram of FIG. 1.

FIG. 2 shows an embodiment of a multiplexer 1-i. The data inputs 4 and 5 are connected to the respective input circuits 31-1 and 31-2 which are connected to a data output 6 via switch means 40 which will be described in more detail hereinafter. Of the two input circuits only the input circuit 31-1 is represented in more detail, since the design of the input circuit 31-2 is totally identical with that of input circuit 31-1. Input circuit 31-1 comprises two buffer memories 32-1 and 32-2, indicating means 33, congestion detector 34, AND gate 35 and a congestion signal transmitter 36. The indicating means 33 to be described in more detail hereinafter generate signals regarding the condition of the buffer memories 32-1 and 32-2. These signals indicate whether a buffer is read out or not, whether data is written in a buffer and whether or not a buffer is completely empty or full. The indicating means 33 use the information given by these signals also for controlling the writing or reading of one of the two buffers 32-1 and 32-2. The congestion detector 34 comprises in a customary fashion logic elements which are widely known By means of a data bus data input 4 is connected to input 46 of buffer 32-1 and input 49 of buffer 32-2. Buffer 32-1 has an output 48 which is connected via a data bus to input 53 of indicating means 33, and has an input 47 to which output 52 of indicating means 33 is connected via a clock signal conductor. Buffer 32-2 is connected to indicating means 33 in a similar way as buffer 32-1. The data cells are written in or read from the buffers 32-1 and 32-2 at the clock signal frequency.

The indicating means 33 have an input 56 to which input 16 of the multiplexer is connected by means of bus 21. Bus 21 comprises, as will be shown with reference to FIG. 6, a cell pulse conductor 23, a clock signal conductor 27 and a conductor 28 for the "empty cell" signal to indicate that an empty data cell is offered to data input 4. An "empty cell" signal may assume two logic values, the first logic value indicating that the data cell is empty and the second logic value that the data cell is not empty. The logic value of each "empty cell" signal is derived from the address field of the incoming data cells by means of an external (not shown in FIG. 2) central control unit in a known fashion. The central control unit is connected to each multiplexer 1 which has not been represented at that location for the sake of clarity of FIG. 1.

If buffer 32-1 is full, output 81 of indicating means 33 applies a "buffer-full" signal to input 91 of congestion detector 34. Accordingly, output 82 of indicating means 33 applies a "buffer full" signal to input 92 of congestion detector 34 if buffer 32-2 is full. Furthermore, output 83 of indicating means 33 is connected to input 93 of congestion detector 34 by means of a clock signal conductor. The clock signal on this clock signal conductor indicates that a non-empty data cell is offered to data input 4.

Congestion detector 34 has an output 84 connected to input 85 of AND gate 35 whose output 87 is connected to input 88 of congestion signal transmitter 36. Cell pulse conductor 23 is connected to input 89 of congestion signal transmitter 36, a cell pulse being used for synchronizing the data cells with the data bus connected to data input 4. Output 90 of congestion signal transmitter 36 constitutes congestion signal output 12 of the multiplexer.

Internal traffic congestion will occur if the buffers 32-1 and 32-2 are full whilst a non-empty data cell is offered at data input 4. If "buffer-full" signals are detected simultaneously at inputs 91 and 92 and a clock signal is detected at input 93, congestion detector 34 will generate at its output 84 a congestion signal having a logic value "1". The congestion signal is offered to input 88 of congestion signal transmitter 36 by means of AND gate 35. Subsequently, the congestion signal is transmitted by the congestion signal transmitter 36 through congestion signal output 12. When congestion signal detector 34 detects a clearance of internal traffic congestion, a delayed congestion signal having a logic value "0" is sent to congestion signal output 12. The delay is obtained from a delay element 103, for example, included in congestion signal transmitter 36 and which delay element 103 will be described hereinafter. It is an object of the delay to avoid data being applied to a buffer immediately after the internal congestion has been cleared. Owing to the data cell supply the buffer could again be completely full and subsequently generate a "buffer-full" signal so that internal congestion would immediately be detected again. A delay of approximately 1 second appears to be sufficient to solve this problem.

The indicating means 33 have an output 57 which is connected via a bus to input 65 of switch means 40, which bus is used for transporting control signals for switching a data cell stream to data output 6. Furthermore, the indicating means 33 have an output 59 connected via a data bus to input 63 of switch means 40 and have an input 58 to which output 64 of switch means 40 is connected via a clock signal conductor. This clock signal conductor conveys a clock signal for reading the buffers 32-1 and 32-2. Input circuit 31-2 is connected to switch means 40 in the same way as input circuit 31-1.

The switch means 40 have an output constituting the data output 6 of multiplexer 1-i, an input constituting input 19 of the multiplexer, and an output connected to the output 18 of the multiplexer by means of a bus. Through input 19 a clock signal is received for transferring data cells from the buffers 32 to the input circuits 31-1 and 31-2. Through output 18 control signals are supplied for writing data cells in buffers 32 of the downstream multiplexers 1.

The switch means 40 also have an output 70 for supplying signals indicating that the buffers 32 in the input circuits 31-1 and 31-2 are not read out at that moment. This output 70 is connected to input 75 of priority means 41. The priority means 41 generate a binary priority signal indicating whether the data cell stream is given priority via data input 4 or data input 5 in order to be switched to data output 6. The switch means 40 further have a priority signal input 72 to which output 76 of priority means 41 is connected by means of a bus 24, an output 73 connected to input 94 of congestion signal receiver 37 by means of a cell pulse conductor 23 and have a congestion signal input 74 to which output 78 of congestion signal receiver 37 is connected.

Switch means 40 also operate as blocking means blocking the clock signal for reading buffers 32 at output 64 or at output 67 in response to an inverted congestion signal at input 74 with the logic value "0" which has been obtained by means of inversion of the congestion signal.

Priority means 41 have an output 76 which is connected to an input 77 of congestion signal receiver 37 by means of bus 24. The latter transports the binary priority signal and the inverted priority signal, which indicate which data input is given priority for conveying data cells to the data output 6. In the description and drawings below it will be assumed that data input 4 has switch priority if the priority signal has the logic value "0", and data input 5 has switch priority if the priority signal has the logic value "1".

As has been described hereinbefore priority means 41 have an input 75 for receiving signals indicating that the buffers 32-1 and 32-2 are not read out. The priority means 41 also have an input constituting the priority input 20 of the multiplexer. To priority input 20 may be connected, for example, a central control unit 102 generating priority signals for all the multiplexers 1 in the ATD network. The priority means themselves will be described hereinafter.

Congestion signal receiver 37 has an input constituting congestion signal input 14 of the multiplexer, an output 79 connected to input 86 of AND gate 35, and an input 80 connected to input 95 of input circuit 31-2.

An external congestion signal (this is a congestion signal originating from a downstream multiplexer 1-k) is applied to congestion signal receiver 37 through congestion signal input 14 of multiplexer 1-i. Congestion signal receiver 37 applies through its output 78 the inverted logic value of this congestion signal to input 74 of switch means 40. If the external congestion signal has a logic value "1" (thus the inverted logic value "0") which logic value indicates that congestion has occurred in a downstream multiplexer 1-k, in response to this logic value the clock signal originating from input 19 is blocked by switch means 40 through one of its two outputs 64 or 67. This achieves that either the buffers 32 in input circuit 31-1 or the buffers 32 in input circuit 31-2 are not read out so that the data cell stream transfer via a data input is blocked.

Figure 5:
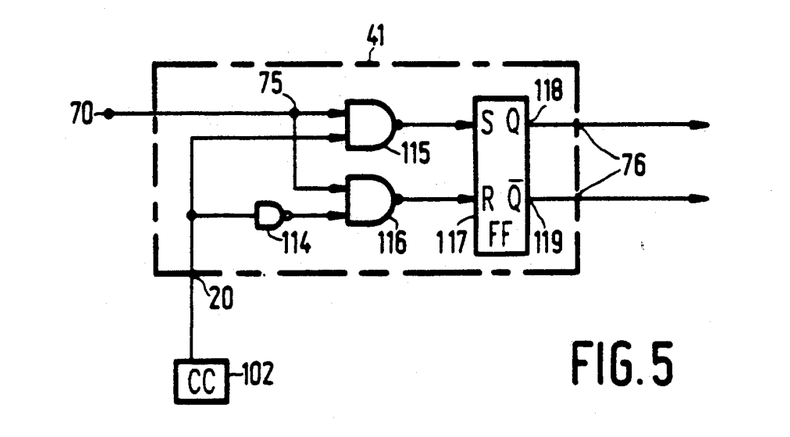
FIG. 5 shows a circuit for assigning priority to a data input of the ATD multiplexer.

In order to determine at which output the clock signal is to be blocked, switch means 40 comprise, for example, a control unit indicating one of the two outputs. A further possibility as shown in the FIGS. 2 and 5 is the use of the priority signal which is offered by the priority means 41 to input 72 of switch means 40. By means of this priority signal, for example, the data input having no priority for conveying the data cells to the data output is blocked. Since the most important data are generally transferred by means of the data input having priority, the transfer of the most essential data is being maintained in this manner.

Yet another possibility is the fact that congestion signal receiver 37 generates the external congestion signal with the logic value "1" at the congestion signal output associated with the blocked data input. If the priority signal on the first conductor of bus 24 has the logic value "1", data input 4 will be switched off if an external congestion signal occurs at congestion signal input 14. A congestion signal with the logic value "1" will be then be available at the output 79 of congestion signal receiver 37 which congestion signal will subsequently be transmitted through congestion signal output 12.

Accordingly, data input 5 will be switched off at the occurrence of an external congestion signal with the logic value "1" at congestion signal input 14 if the inverted priority signal on the
second conductor has the logic value "1". In this case a congestion signal with the logic value "1" will be generated at the output 80 of congestion signal receiver 37 which signal will then be transmitted through congestion signal output 13 of multiplexer 1-i. In addition to being transmitted to further multiplexers 1 the congestion signal can also be transmitted to upstream terminals 2. In that case the terminals 2 will stop transmitting data cells in response to a congestion signal at their congestion signal inputs 15, since transferring data cells to a blocked data input is useless. If this extra option is not utilized, congestion signal receiver 37 may have a very simple structure. In that case only congestion signal input 14 is connected to output 78 by means of an inverter. In this context it is assumed that congestion signal receiver 37 does not comprise a delay element 103.

Figure 3:
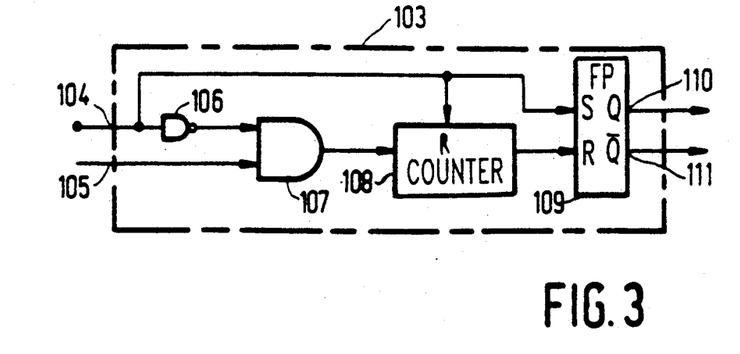
FIG. 3 shows an embodiment of a delay element for congestion signals in the ATD multiplexer.

FIG. 3 shows a delay element 103. Delay element 103 has an input 104 for receiving a congestion signal, an input 105 for receiving a cell pulse, an output 110 for supplying a congestion signal and an output 111 for supplying the inverted congestion signal. If this delay element forms part of, for example, congestion signal transmitter 36, inputs 104, 105 and output 110 correspond with the inputs 88, 89 and output 90 respectively. Delay element 103 comprises an inverter 106, an AND gate 107, a counter 108 and a flip-flop 109.

Input 104 is connected to AND gate 107 by means of inverter 106 and is also connected to the reset input of counter 108 and the set input flip-flop 109. Input 105 is directly connected to AND gate 107. AND gate 107 has an output connected to the input of counter 108 the output of counter 108 being connected to the reset input of flip-flop 109. The outputs of flip-flop 109 form the outputs 110 and 111 respectively, of delay element 103.

A congestion signal at input 104 is fed to output 110 through the set input of flip-flop 109. If the congestion signal assumes the logic value "1", the cell pulse at input 105 is blocked by means of AND gate 107, and counter 108 is reset by the congestion signal at the reset input. Once the congestion signal has assumed the logic value "0", the cell pulse is given access to the counter 108 through AND gate 107. When the counter 108 has reached the final count, flip-flop 109 is reset.

Figure 4:
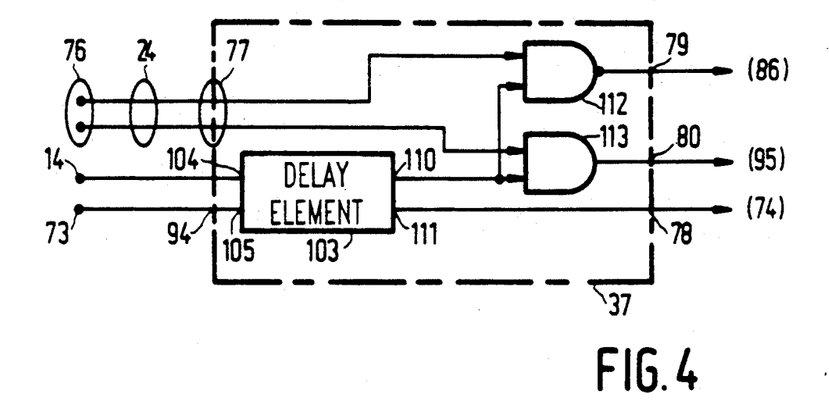
FIG. 4 shows an embodiment of a congestion signal receiver in the ATD multiplexer.

FIG. 4 shows an embodiment of congestion signal receiver 37. Congestion signal receiver 37 comprises a delay element 103 and two AND gates 112 and 113. Input 104, input 105 and output 111 of delay element 103 correspond with congestion signal input 14 of multiplexer 1-i, input 94 and output 78 respectively, of congestion signal receiver 37. Output 110 of delay element 103 is connected to AND gates 112 and 113.

Bus 24 which is connected to input 77 of congestion signal receiver 37 comprises two conductors transporting the priority signal and the inverted priority signal. The first conductor is connected to AND gate 112 and the second conductor is connected to AND gate 113. The outputs of AND gates 112 and 113 correspond with outputs 79 and 80 respectively, of congestion signal receiver 37.

FIG. 5 shows an embodiment of the priority means 41. The priority means 41 comprise an inverter 114, two AND gates 115 and 116 and flip-flop 117. Input 20 of the priority means 41 is directly connected to AND gate 115 and connected to AND gate 116 by means of inverter 114. Input 75 of the priority means which is connected to the output 70 of switch means 40 is also connected to the AND gates 115 and 116. The outputs of the AND gates 115 and 116 are connected to the set and reset inputs respectively, of flip-flop 117. The outputs 118 and 119 of flip-flop 117 together form output 76 of the priority means 41 and generate the priority signal and inverted priority signal respectively. The priority signal at priority input 20 controls the flip-flop 117 provided that the buffers 32 in the input circuits are not read out at that moment. Consequently, the priority of the data cell streams originating from the input circuits 31-1 and 31-2 can only be switched after a data cell has been read out completely.

Figure 6:
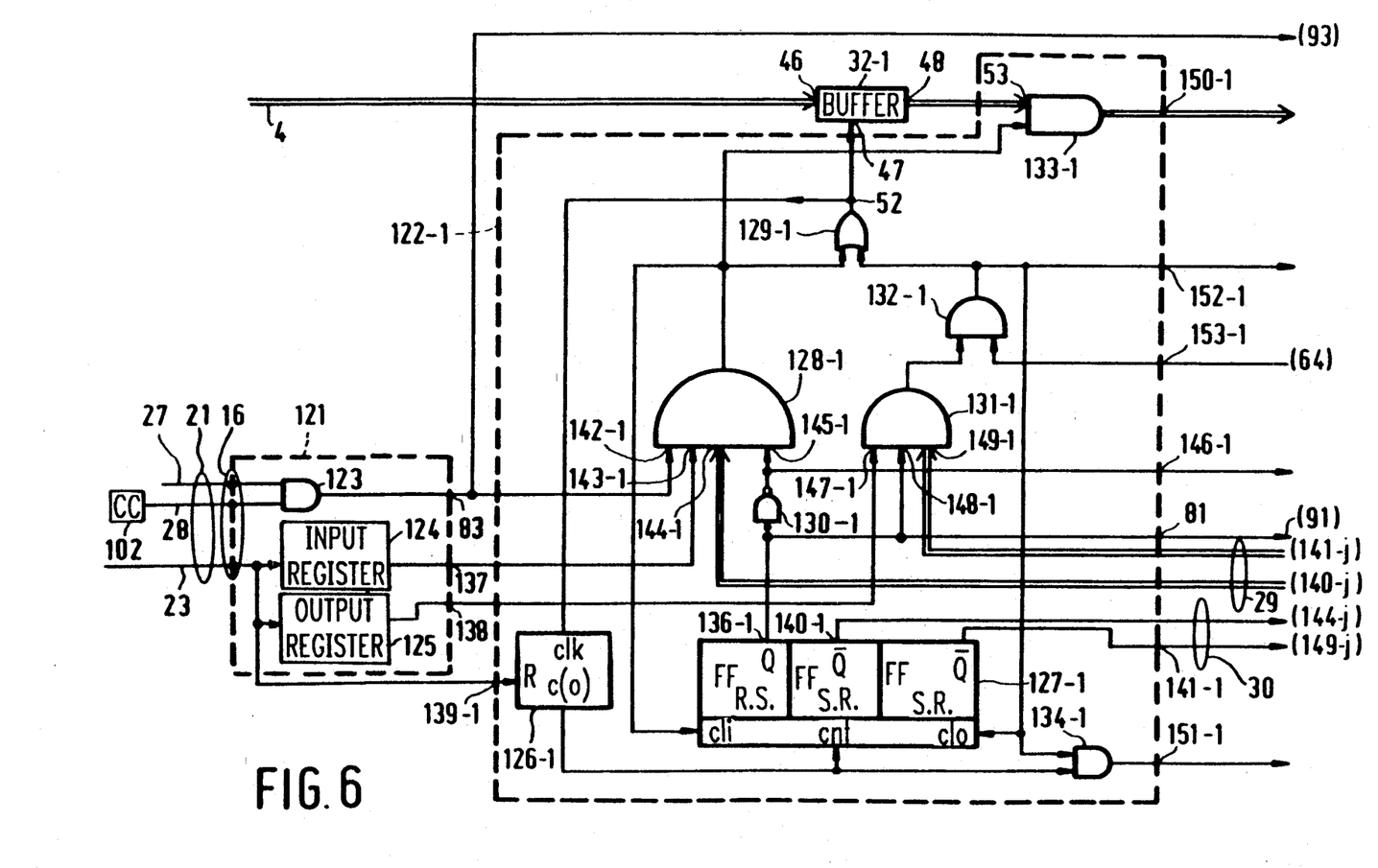
FIG. 6 shows a circuit for writing or reading data cells in or out of a buffer.
Figure 7:
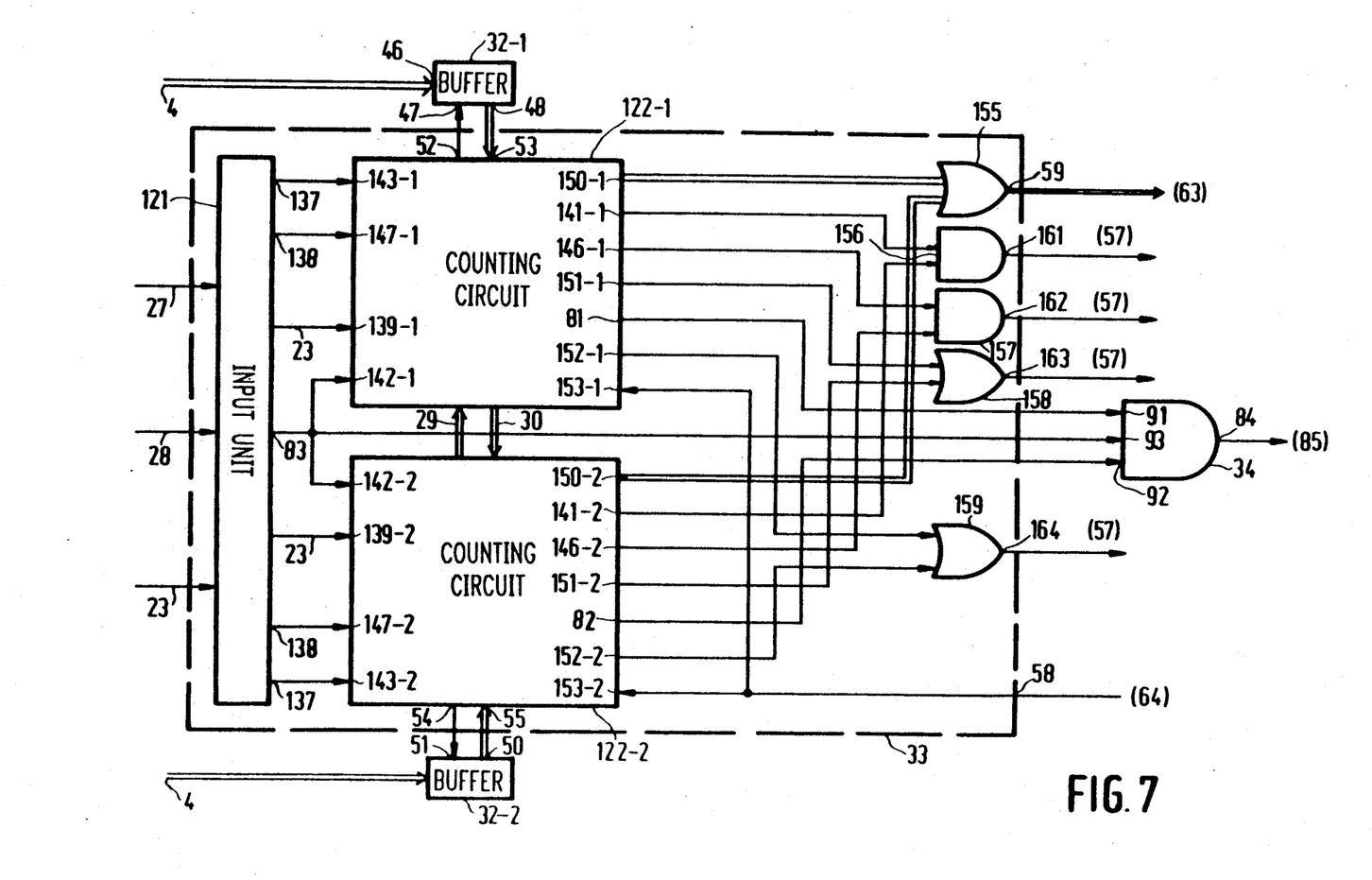
FIG. 7 shows an embodiment of an input circuit of the ATD multiplexer.

FIG. 6 shows a diagram of a circuit 122-1 for writing data cells in or reading them a buffer 32-1. Circuit 122-1 receives input signals through an input unit 121. Input unit 121 and circuit 122-1 form part of indicating means 33 as represented in FIG. 7. The input to input unit 121 is formed by input 16 of the multiplexer 1-i in FIG. 2. As described with reference to FIG. 2, bus 21 is connected to input 16 and comprises cell pulse conductor 23, a clock signal conductor 27 and a conductor 28 for the data cell empty signal.

Input unit 121 comprises an AND gate 123, an input register 124 and an output register 125. Clock signal conductor 27 and conductor 28 are connected to the two inputs of AND gate 123. When the "empty cell" signal has the first logic value, the clock signal on clock signal conductor 27 is not accessed to circuit 122-1 by AND gate 123 so that the data cell cannot be written in a buffer 32-1 by circuit 122-1. Cell pulse conductor 23 is connected to the inputs of input register 124 and output register 125 respectively. Input register 124 and output register 125 are connected to buffer 32-1 by means of gates 128-1 and 129-1, 131-1, 132-1 and 129-1 respectively, and also connected to other buffers 32-9 not shown in the Figure which buffers, like buffer 32-1, are connected to data input 4 of multiplexer 1. Input register 124 indicates in which of the buffers 32 a data cell is to be written and output register 125 indicates from which of the buffers 32 a data cell is to be read.

Circuit 122-1 comprises a counter 126-1, a status register 127-1, an OR gate 129-1, an inverter 130-1 and AND gates 128-1, 131-1, 132-1, 133-1 and 134-1. Cell pulse conductor 23 is also connected to the reset input 139-1 of counter 126-1. Counter 126-1 has a clock input to which the output 52 of AND gate 129-1 is connected. Counter 126-1 further has an output connected to a count input of status register 127-1 for indicating that the counter 126-1 has reached the logic value "0". The output of counter 126-1 is also connected to AND gate 134-1. Status register 127-1 has a first clock input for receiving clock pulses for writing the data cells in buffer 32-1, which clock input is connected to the output of AND gate 128-1. Status register 127-1 has a second clock input for receiving clock pulses for reading data cells from buffer 32-1, which clock input is connected to the output 152-1 of AND gate 132-1. Status register 127-1 comprises three flip-flop circuits, the first flip-flop indicating whether buffer 32-1 is full or empty, the second flip-flop indicating whether the buffer can be written or not written and the third flip-flop indicating whether the buffer 32-1 can be read out or not. The output 136-1 of the first flip-flop forms output 81 of indicating means 33 and supplies a binary signal, the signal having the logic value "1" if buffer 32-1 is full and the logic value "0" if buffer 32-1 is empty. Output 136-1 is further connected to inverter 130-1 and AND gate 131-1. The output 140-1 of the second flip-flop produces a binary signal for indicating the full/empty condition of buffer 32-1, the signal having the logic value "0" if the buffer 32-1 is written and the logic value "1" if the buffer 32-1 is not written. Output 140-1 is connected to AND gate 128-1 of further circuits 122-j which write data cells in the further buffers 32-j or read them therefrom, these buffers 32-j being connected to the same data input as buffer 32-1. Consequently, a plurality of successive data cells can be stored. The output 141-1 of the third flip-flop supplies a binary signal which has the logic value "0" if buffer 32-1 is read and the logic value "1" if the buffer 32-1 is not read. Output 141-1 is connected to AND gate(s) 131-j in circuit(s) 122-j.

AND gate 128-1 has four inputs 142-1, 143-1, 144-1 and 145-1, to which are connected respectively, the output of AND gate 123 for transferring a clock signal for writing data cells in buffer 32-1 and constituting the output 83 of indicating means 33, the output 137 of input register 124, the output(s) 140-j of status register(s) 127-k in circuit(s) 122-j, and the output of inverter 130-1. This output forms output 146-1 of circuit 122-1. The output of AND gate 128-1 is connected to OR gate 129-1 and AND gate 133-1 in addition to being connected to the first clock input of status register 127-1. AND gate 131-1 has three inputs 147-1, 148-1 and 149-1 of which input 147-1 also constitutes an input to circuit 122-1 and is connected to output 138 of output register 125, input 148-1 is connected to output 136-1 of status register 127-1, and input 149-1 is connected to the output(s) 141-j of status register(s) 127-j in circuit(s) 122-j. The output of AND gate 131-1 is connected to an input of AND gate 132-1, the other input of AND gate 132-1 constituting input 153-1 of circuit 122-1 to which output 64 of switch means 40 is connected. The output 152-1 of AND gate 132-1 is connected to OR gate 129-1 and AND gate 134-1 in addition to being connected to the second clock input of status register 127-1. The output 151-1 of AND gate 134-1 is used for supplying cell pulses. The output of OR gate 129-1 constituting the outputs 52 of indicating means 33 is connected to the input 47 of buffer 32-1. Buffer 32-1 comprises a data input 46 connected to data input 4 of multiplexer 1 and comprises a data output 48 connected to an input of AND gate 133-1, which input forms the input 53 of indicating means 33. AND gate 133-1 has an input 150-1 for the outgoing data cells.

Buffer 32-1 is written or read by accessing to the clock input of buffer 32-1 a clock pulse originating from the output S2 of OR gate 129-1. After 256 clock pulses a complete data cell is written or read out. Counter 126-1 is therefore a 256-counter counting the number of clock pulses coming from output 52 of OR gate 129-1. In this manner it is known whether a write or read action has finished. The three flip-flops of status register 127-1 indicate the condition of buffer 32-1. The first flip-flop to indicate full/empty is set if the counter 126-1 has the logic value "0" and if, simultaneously, clock pulses have been received at the first clock input of the status register. The flip-flop is reset if the counter 126-1 has the logic value "0" and if, simultaneously, clock pulses have been received at the second clock input of the status register. By means of the set signal the flip-flop thus indicates that the buffer 32-1 is full and by means of the reset signal the flip-flop indicates that buffer 32-1 is empty. The second flip-flop to indicate whether buffer 32-1 is being written in is set if the counter 126-1 has not the logic value "0" and if, simultaneously, clock pulses are being received at the first clock input. This second flip-flop is reset if the counter 126-1 has the logic value "0" and if, simultaneously, clock pulses have been received at the first clock input. The third flip-flop to indicate whether buffer 32-1 is being read out is set if the counter 126-1 has not the logic value "0" and if, simultaneously, clock pulses are being received at the second clock input of the status register. This third flip-flop is reset if the counter has the logic value "0" and if, simultaneously, clock pulses have been received at the second clock input. By means of the set signal the third flip-flop indicates that the buffer 32-1 is being read out and the reset signal indicates that buffer 32-1 is not being read out.

Buffer 32-1 is being written in by accessing the clock signal present at the output of AND gate 123 to OR gate 129-1 by means of AND gate 128-1. This access is effected under three conditions viz. that firstly the input register 124 indicates buffer 32-1 (by applying to AND gate 128-1 a signal having the logic value "1"), secondly that the buffers 32-j are not written in (the outputs 140-j produce a signal having the logic value "1") and thirdly that buffer 32-1 is empty (output 81 of status register 127-1 produces a signal having the logic value "0").

Buffer 32-1 is being read out by accessing the clock signal coming from output 64 of switch means 40 to the OR gate 129-1 by means of AND gate 132-1. This access is effected under three conditions viz. that firstly the output register 125 indicates buffer 32-1 (by applying to AND gate 131-1 a signal having the logic value "1"), secondly that the buffers 32-j are not read out (the outputs 141-j produce a signal with the logic value "1") and thirdly that buffer 32-1 is full (output 81 of status register 127-1 supplies a signal having a logic value "1").

FIG. 7 shows a block diagram of the input circuit 31-1 already discussed with reference to FIG. 2. Input circuit 31-1 comprises indicating means 33 connected to buffers 32-1 and 32-2 and also to congestion detector 34, the latter having the structure of an AND gate. Indicating means 33 comprise input unit 121, circuits 122-1 and 122-2 belonging to the respective buffers 32-1 and 32-2, AND gates 156 and 157 and OR gates 155, 158 and 159.

Three conductors 23, 27 and 28 are connected to input unit 121 as is shown in FIG. 6. Cell pulse conductor 23 is further connected to input 139-1 of circuit 122-1 and input 139-2 of circuit 122-2. Input unit 121 further includes three outputs 83, 137 and 138. Output 83 is connected to input 142-1 of circuit 122-1, input 142-2 of circuit 122-2 and input 93 of congestion detector 34. Output 137 is connected to input 143-1 of circuit 122-1 and input 143-2 of circuit 122-2. Output 138 of input unit 121 is finally connected to input 147-1 of circuit 122-1 and input 147-2 of circuit 122-2.

The circuits 122-1 and 122-2 are interconnected by means of buses 29 and 30. Bus 29 conveys as being indicated in FIG. 6, the signals from outputs 140-1 and 141-1 to the respective inputs 144-2 and 149-2, the signal of output 140-1 indicating that buffer 32-1 is not being written in and the signal of output 141-1 indicating that buffer 32-1 is not being read out. Bus 30 conveys signals corresponding with buffer 32-2. Furthermore, output 52 and input 53 of circuit 122-1 are connected to clock input 47 and data output 48 respectively, of buffer 32-1. Accordingly, output 54 and input 55 of circuit 122-2 are connected to clock input 51 and data output 50 respectively, of buffer 32-2. Circuit 122-1 has output 150-1 for outgoing data cells, output 141-1 for signals indicating that buffer 32-1 is not written in, output 146-1 for signals indicating that buffer 32-1 is empty, output 81 for signals indicating that buffer 32-1 is full, output 151-1 for outgoing cell pulses and output 152-1 for outgoing clock pulses and has also input 153-1 for incoming clock pulses for reading buffer 32-1. The outputs 150-1, 141-1, 146-1, 81, 151-1 and 152-1 and input 153-1 are connected to OR gate 155, AND gates 156, 157 and 34, OR gates 158 and 159 and output 64 of switch means 40 in that order. Circuit 122-2 has outputs 150-2, 141-2, 146-2, 82, 151-2 and 152-2 and input 153-2 for corresponding signals which inputs are connected to OR gate 155, AND gates 156, 157 and 34, OR gates 158 and 159 and output 64 of switch means 40 in that order.

Input 153-1 of circuit 122-1 and input 153-2 of circuit 122-2 jointly form input 58 of indicating means 33. Output 136-1 of status register 127-1 and output 136-2 of status register 127-2 form respectively, as indicated in FIG. 6, the outputs 81 and 82 of indicating means 33, which are connected to the inputs 91 and 92 of congestion detector 34. Indicating means 33 have an output 59 for outgoing data cells, output 161 for signals indicating that buffers 32-1 and 32-2 are not being read, output 162 for signals indicating that the buffers 32-1 and 32-2 are empty, output 163 for producing cell pulses, and output 164 for producing clock pulses. The outputs of OR gate 155, AND gates 156 and 157, and OR gates 158 and 159 are formed by the outputs 59, 161, 162, 163 and 164 of indicating means 33 in that order, whereby outputs 161, 162, 163 and 164 jointly form output 57 of indicating means 33. The output signals of these gates are transported to input 65 of switch means 40 by means of a bus.

Figure 8:
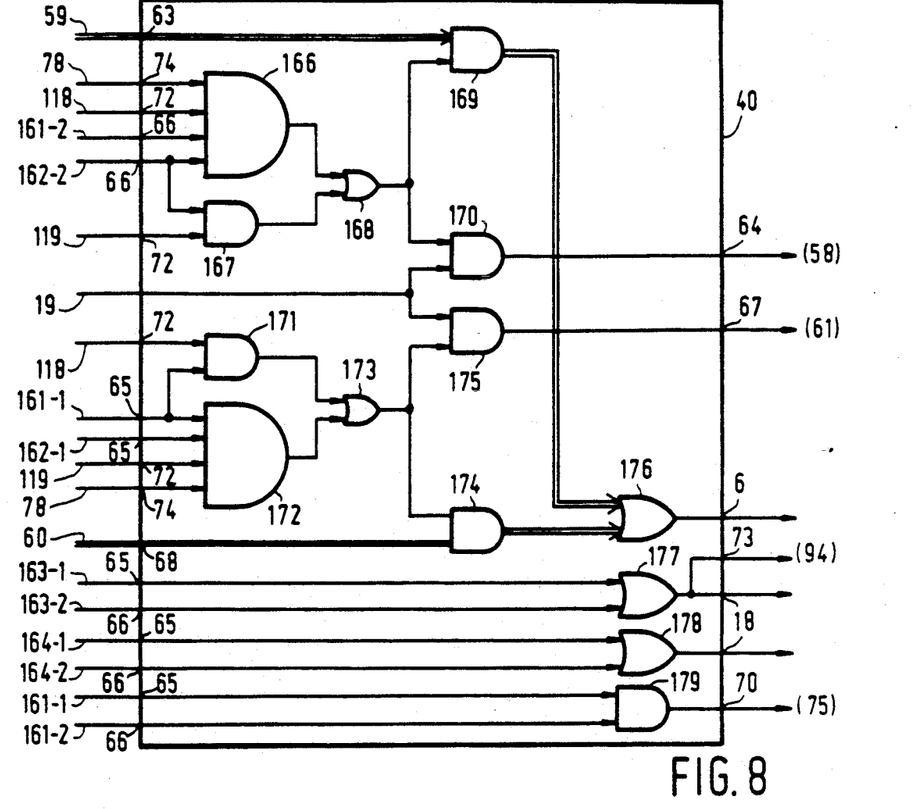
FIG. 8 shows an embodiment of the switch means in the ATD multiplexer.

In FIG. 8 an embodiment of switch means 40 is shown. Switch means 40 comprise AND gates 166, 167, 169, 170, 171, 172, 174, 175 and 179, and furthermore, OR gates 168, 173, 176, 177 and 178. Data output 59 of indicating means 33 which also constitutes the data output of input circuit 31-1 plus data output 60 of input circuit 31-2 are connected to OR gate 176 by means of the respective AND gates 169 and 174. The output of OR gate 176 constitutes data output 6 of the multiplexer. This drawing Figure comprises indices 1 and 2 for the outputs of the indicating means 33 in input circuits 31-1 and 31-2 respectively, for clarity. The outputs 163-1 and 163-2 are connected to OR gate 177 by means of cell pulse conductors. Outputs 164-1 and 164-2 are connected to OR gate 178 by means of clock signal conductors. The outputs of OR gates 177 and 178 jointly form the output of switch means 40 which is connected to output 18 of the multiplexer. Outputs 161-1 and 161-2 for producing signals indicating that the buffers 32 in the respective input circuits 31-1 and 31-2 are not being read out are connected to AND gate 179. The output of AND gate 179 constitutes output 70 of the switch means 40 which is connected to input 75 of priority means 41.

AND gate 166 has four inputs one of which being formed by input 74 of the switch means 40 which is connected to output 78 of congestion signal receiver 37, a second input being connected to output 118 of priority means 41 and two further inputs being connected to outputs 161-2 and 162-2 of indicating means 33 in input circuit 31-2. AND gate 172 likewise has four inputs one of which being formed by input 74 of the switch means 40 which is connected to output 78 of congestion signal receiver 37, a second input being connected to output 119 of priority means 41 and two further inputs being connected to outputs 161-1 and 162-1 of indicating means 33 in input circuit 31-1. AND gate 167 has two inputs which are connected to output 119 of priority means 41 and output 161-2 of input circuit 31-2. AND gate 171 further has two inputs which are connected to output 118 of priority means 41 and output 161-1 of input circuit 31-1. The outputs of AND gates 166 and 167 are connected to AND gates 169 and 170 by means of OR gate 168. The outputs of AND gates 171 and 172 are connected to AND gates 174 and 175 by means of OR gate 173. In addition, the clock input of switch means 40 corresponding with the input 19 of the multiplexer is connected to AND gates 170 and 175. The outputs of AND gates 170 and 175 form the respective outputs 64 and 67 of the switch means.

The switch means 40 combine the data cells at the data outputs 59 and 60 of input circuits 31-1 and 31-2 by means of OR gate 176. The data cells at data output 59 are switched under the control of AND gate 166 provided that the four conditions are fulfilled, that is to say, that firstly the data cells coming from the input circuit 31-2 have switch priority (the priority signal at output 118 has the logic value "1"), secondly the buffers 32 in input circuit 31-2 are not being read out (the signal at output 161-2 has the logic value "1"), thirdly the buffers 32 in input circuit 31-2 are empty (the signal at output 162-2 has the logic value "1") and fourth no congestion has been detected (the inverted congestion signal at input 74 has the logic value "1"). Data cells at data output 59 are also switched under the control of AND gate 167 if the following two conditions are satisfied, first the data cells coming from the input circuit 31-1 have switch priority (the inverted priority signal at output 119 has the logic value "1") and secondly that the buffers 32 in input circuit 31-2 are not being read out the signal at output 161-2 has the logic value "1").

Accordingly, data cells at data output 60 are switched under the control of AND gate 172 provided the following four conditions are satisfied, that is to say, that first the data cells coming from input circuit 31-1 have switch priority (the priority signal at output 119 has the logic value "1"), secondly the buffers 32 in input circuit 31-1 are not being read out (the signal at output 161-1 has the logic value "1"), thirdly the buffers 32 in input circuit 31-1 are empty (the signal at output 162-1 has the logic value "1") and fourth that no congestion has been detected (the inverted congestion signal at input 74 as the logic value "1"). Data cells at data output 60 are also switched through under the control of AND gate 171 provided that the following two conditions are satisfied, that is to say, that first the data cells coming from the input circuit 31-2 have switch priority (the inverted priority signal at output 118 has the logic value "1") and secondly that the buffers 32 in input circuit 31-1 are not being read out the output signal at output 161-1 has the logic value "1").

At the same time inside the switch means 40 the permission is formed for passing the clock signal from input 19 via AND gate 170 to input circuit 31-1 or via AND gate 175 to input circuit 31-2. This permission depends on the logic value of the priority signal and the logic value of the inverted congestion signal. If the inverted congestion signal at input 74 has the logic value "0", this means that the next multiplexer can no longer receive any data cells. In this case only data cells of a single data input are switched through and in this embodiment this data input is the one having priority. Only one of the two input circuits 31-1 or 31-2 connected to the data input that has been assigned switch priority will still receive clock pulses for reading data cells from the buffers 32. The other input circuit 31 will be blocked so that only the input circuit is written. Consequently, when this first input circuit is filled, a congestion signal with a logic value "1" will be applied to multiplexers and terminals upstream in the network. In response thereto measures can be taken for reducing the data cell stream by, for example, preventing these terminals from producing data. The switch means 40, as has been described hereinbefore, thus also operate as blocking means.

Figure 9:
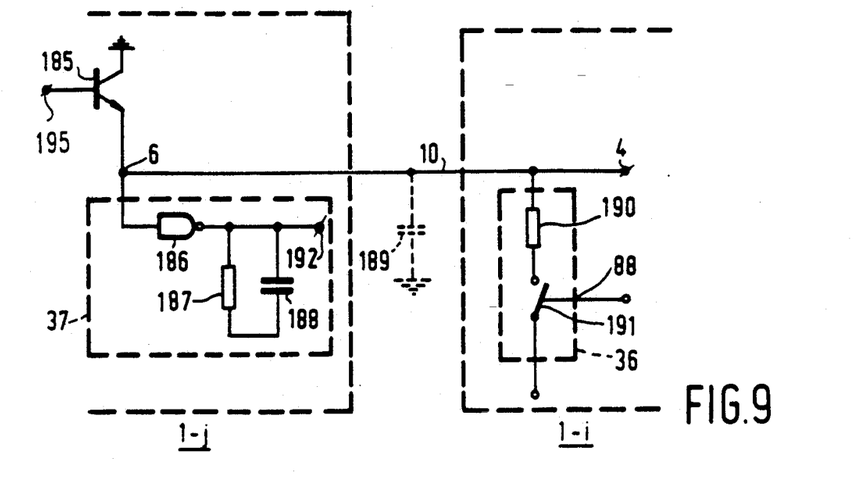
FIG. 9/shows a circuit for transferring congestion signals by means of the data bus.

FIG. 9 shows a circuit for transmitting congestion signals from a multiplexer 1-i to a further multiplexer 1-j over data bus 10. The data output 6 of multiplexer 1-j is connected over data bus 10 to data input 4 of multiplexer 1-i, data bus 10 comprising a stray capacitance 189 which may be assumed to be located between data bus 10 and ground. Data output 6 is formed by the emitter of an emitter-follower 185 whose collector is grounded and the inverse data signal is conveyed to data output 6 via the base. Data output 6 is connected to congestion signal receiver 37 comprising an inverter 186 and a parallel arrangement of resistor 187 and capacitor 188. Inverter 186 has an input connected to data output 6 and an output 192 connected to one end of the parallel arrangement. From this junction the congestion signal can be tapped. The other end of the parallel arrangement is connected to a fixed reference voltage of, for example, $-5$. To data input 4 of the second multiplexer 1-i, congestion signal transmitter 36 is connected comprising a resistor 190 and a switch 191 arranged in series therewith. The end of switch 191 not connected to resistor 190 is connected to a fixed voltage having the value of approximately $-2.5$ V. Resistor 190 forms the characteristic terminating impedance of data bus 10. Switch 191 which may be formed by a transistor has a control input connected to input 88 of congestion signal transmitter 36.

The congestion signal at input 88 may have two voltage values 0 V and −0.8 V, these two values corresponding to the respective logic values "1" and "0" of the congestion signal. The data which are available at the base 195 of transistor 185 may also assume two voltage values of 0 V and 0.8 V, which values correspond with the bit values "1" and "0". Transistor 185 is set in a manner such that transistor 185 is always conductive having a forward voltage of the base-emitter diode of 0.8 V. The result is that the voltages on data bus 10 are −0.8 v and −1.6 V respectively.

With a voltage of 0 volts on the base, transistor 185 is set low-ohmic so that the stray capacitance 189 is rapidly charged to a voltage of −0.8 V. In the case of a voltage of −0.8 V on the base of transistor 185, transistor 185 is set high-ohmic so that the stray capacitance 189 is rapidly charged to a voltage of −1.6 V. The stray capacitance 189 and resistor 190 have values such that the time constant of the discharging circuit formed by capacitor 189 and resistor 190 is small. The stray capacitance 189 will consequently be rapidly discharged through resistor 190 if switch 191 is conductive. However, if a 0-volts congestion signal, indicating that congestion has occurred, is available at input 88, the switch 191 will not be conductive. The stray capacitance 189 will then no longer be in a position to be discharged through resistor 190. If, in that case, a data signal having a bit value of "1", thus having a voltage of 0 volts, will be available at the base of the transistor 185, the stray capacitance 189 will be charged immediately to the highest voltage that may occur, that is to say −0.8 V, as a result of the extremely good conductance of transistor 185 with a voltage value of 0 V on its base. The voltage on data bus 10 will then be virtually constant at −0.8 v for a good many bi periods because transistor 185 is high-ohmic with a data signal having a bit value of "0" on its base.

With this method of congestion detection it is assumed that the data cell does not only have the logic value "1" but that in a data cell the logic values "0" and "1" occur in reasonable alternation. Congestion is detected by means of inverter 186, which is used merely for obtaining a high input impedance, and the parallel arrangement of resistor 187 and capacitor 188. Inverter 186 comprises a MOS transistor (Metal Oxide Semiconductor) because of its high input impedance so that the capacitance 189 of data bus 10 is not discharged by the impedance of the parallel arrangement. Inverter 186 inverts the voltage values of −0.8 V and −1.6 V to the respective values −1.6 V and −0.8 V. The parallel arrangement of resistor 187 and capacitor 188 has a time constant of approximately 1.5 microseconds which corresponds with a time interval, in which three data cells are transmitted via data output 6. If for a period of 1.5 microseconds −1.6 V is detected at the output of inverter 186, it is assumed that congestion has occurred in the downstream multiplexers or that a wire rupture has occurred in data bus 10. The voltage of the data bus 10 will thus remain constant at a level of −0.8 V if wire rupture has taken place in the data bus.

What is claimed is:

1. Method of combining two streams of data cells into a single outgoing stream of data cells in an ATD multiplexer having a data input for each one of the two incoming data cell streams and a data output for the outgoing data cell stream, characterized in that the occurrence of internal traffic congestion in the case of data cell stream transfer from a data input to a data output is detected, and upon detection of the internal traffic congestion an internal congestion signal having a first value is transmitted to a congestion signal transmitter associated with the relevant ATD multiplexer data input, in that the transport of a data cell stream via a data input is blocked in response to a first value of an external congestion signal received by the ATD multiplexer, in that after the internal traffic congestion has been cleared a second value of the internal traffic congestion signal corresponding with the cleared status is transmitted to the congestion signal transmitter such that the transport of the data cell continues after a predetermined delay.

2. Method as claimed in claim 1, characterized in that each data input is connected to at least one buffer circuit having an output connected to the data output, in that the presence of a data cell at a data input is detected, in that the buffer-full condition is detected of each buffer circuit connected to the associated data input, an din that when there is a concurrent situation of a full buffer and a data cell present at the data input the first value of the internal congestion signal is generated to block transport of the data cell via the data input.

3. Method as claimed in claim 1, characterized in that switch priority is assigned to one of the two data inputs and in that the transfer of a data cell stream through the data input not having priority is blocked upon detection of the first value of an external congestion signal.

4. Method as claimed in claim 2, characterized in that the blocking of the transfer of a data cell stream from a data input to the data output is realized by preventing the reading of the buffer circuits connected to the relevant data input.

5. Method as claimed in claim 1, characterized in that the received external congestion signal is conveyed to the congestion signal transmitter associated with the blocked data input.

6. ATD multiplexer, characterized in that the ATD multiplexer comprises two data inputs and one data input, in that the ATD multiplexer comprises for each data input a congestion detector for detecting internal traffic congestion and applying a first value of an internal congestion signal to a congestion signal transmitter, an output of the detector being connected to the input of the congestion signal transmitter, in that the ATD multiplexer comprises blocking means for blocking the data cell stream transfer via a data input, in that the ATD multiplexer comprises a congestion signal receiver having an input for receiving from a congestion signal transmitter an external congestion signal transmitter comprising a delay element for applying a second value of the internal congestion signal to the output of the congestion signal transmitter after a predetermined delay.

7. An ATD multiplexer as claimed in claim 6, characterized in that one end of an impedance is connected to the data input and the other end is coupled to a reference terminal via switch means whereby the data input is connectable to a data receive line, in that the switch means are connected to an output of the congestion signal transmitter associated with the data input and switch off the impedance in response to the first value of the internal congestion signal, and in that the input of the congestion signal receiver is connected to t he data output, this congestion signal receiver comprising detecting means linked to a data transfer line connected to the data output for detecting whether an impedance at the end of the data transfer line is switched off or not, an input and an output of the detecting means constituting the input and output respectively, of the congestion signal receiver.

8. ATD multiplexer as claimed in claim 7, characterized in that the detecting means comprise an emitter-follower, and a parallel arrangement of a capacitance and an impedance for detecting a voltage value on the data transmission line, the emitter of the emitter-follower constituting the input of the detecting means, the input of the parallel arrangement being connected to the emitter of the emitter-follower and the output of the parallel arrangement constituting the output of the detecting means.

9. ATD multiplexer as claimed in claim 6, characterized in that each of the data inputs is connected to an input of at least one buffer circuit which buffer circuit has an output connected to the data output, in that a congestion detector associated with a data input has one detecting input per buffer circuit belonging to the relevant data input and has a further input for receiving a presence signal indicating the presence of a data cell at the relevant data input, the ATD multiplexer comprising indicating means applying a buffer-full signal to a detecting input of the congestion detector belonging to the buffer circuit when the buffer circuit is full, and in that the congestion detector produces a first value of a congestion signal at its output upon detecting simultaneously a buffer-full signal at each detection input and a presence signal at the further input.

10. ATD multiplexer as claimed in claim 6, characterized in that the ATD multiplexer comprises means for assigning switch priority to one of the two data inputs, whereby the blocking means of the ATD multiplexer block the data cell stream through the data input not having priority in response to the first value of an external congestion signal.

11. ATD multiplexer as claimed in claim 9, characterized in that the blocking means block the transport of a data cell stream from a data input to the data output in response to the first value of the congestion signal by preventing each buffer circuit that is connected to the relevant data input from being read out.

12. ATD multiplexer as claimed in claim 6, characterized in that the output of the congestion signal receiver is coupled to the input of the congestion signal transmitter associated with the block data input.

13. ATD multiplexer, characterized in that the ATD multiplexer comprises two data inputs and one data output, in that the ATD multiplexer comprises for each data input a congestion detector for detecting internal traffic congestion and applying a first value of an internal congestion signal to a congestion signal transmitter, an output of the detector being connected to the input of the congestion signal transmitter, in that the ATD multiplexer comprises blocking means for blocking the data cell stream transfer via a data input, in that the ATD multiplexer comprises a congestion signal receiver having an input for receiving from a congestion signal transmitter an external congestion signal and an output connected to an input of the blocking means, each congestion signal receiver comprising a delay element for applying a second value of the external congestion signal to the output of the congestion signal receiver after a predetermined delay.

14. An ATD multiplexer as claimed in claim 13, characterized in that one end of an impedance is connected to the data input and the other end is coupled to a reference terminal via switch means whereby the data input is connectable to a data receive line, in that the switch means are connected to an output of the congestion signal transmitter associated with the data input and switch off the impedance in response to the first value of the internal congestion signal, and in that the input of the congestion signal receiver is connected to the data output, this congestion signal receiver comprising detecting means linked to a data transfer line connected to the data output for detecting whether an impedance at the end of the data transfer line is switched off or not, an input and an output of the detecting means constituting the input and output respectively, of the congestion signal receiver.

15. ATD multiplexer as claimed in claim 14, characterized in that the detecting means comprise an emitter-follower, and a parallel arrangement of a capacitance and an impedance for detecting a voltage value on the data transmission line, the emitter of the emitter-follower constituting the input of the detecting means, the input of the parallel arrangement being connected to the emitter of the emitter-follower and the output of the parallel arrangement constituting the output of the detecting means.

16. ATD multiplexer as claimed in claim 13, characterized in that each of the data inputs is connected to an input of at least one buffer circuit which buffer circuit has an output connected to the data output, in that a congestion detector associated with a data input has one detecting input per buffer circuit belonging to the relevant data input and has a further input for receiving a presence signal indicating the presence of a data cell at the relevant data input, the ATD multiplexer comprising indicating means applying a buffer-full signal to a detecting input of the congestion detector belonging to the buffer circuit when the buffer circuit is full, and in that the congestion detector produces a first value of a congestion signal at its output upon detecting simultaneously a buffer-full signal at each detection input and a presence signal at the further input.

17. ATD multiplexer as claimed in claim 13, characterized in that the ATD multiplexer comprises means for assigning switch priority to one of the two data inputs, whereby the blocking means of the ATD multiplexer block the data cell stream through the data input not having a priority in response to the first value of an external congestion signal.

18. ATD multiplexer as claimed in claim 16, characterized in that the blocking means block the transport of a data cell stream from a data input to the data output in response to the first value of the congestion signal by preventing each buffer circuit that is connected to the relevant data input from being read out.

19. ATD multiplexer as claimed in claim 13, characterized in that the output of the congestion signal receiver is coupled to the input of the congestion signal transmitter associated with the blocked data input.

* * * * *